No. 691,817. Patented Jan. 28, 1902.
J. A. SMITH.
FRICTION CLUTCH.
(Application filed Apr. 22, 1901.)
(No Model.)

Witnesses:
George H. Rad
Walter E. Wilson

Inventor
John A. Smith
By Chapin A Ferguson
Attorney

UNITED STATES PATENT OFFICE.

JOHN A. SMITH, OF BALTIMORE, MARYLAND, ASSIGNOR TO SMITH LYRAPHONE COMPANY, A CORPORATION OF WEST VIRGINIA.

FRICTION-CLUTCH.

SPECIFICATION forming part of Letters Patent No. 691,817, dated January 28, 1902.

Application filed April 22, 1901. Serial No. 56,838. (No model.)

*To all whom it may concern:*

Be it known that I, JOHN A. SMITH, a citizen of the United States, residing at Baltimore, in the State of Maryland, have invented certain new and useful Improvements in Friction-Clutches, of which the following is a specification.

This invention relates to improvements in friction-clutches and is especially adapted for use in connection with mechanical piano-players for driving the main shaft, from which power is transmitted by a belt or other suitable means to the operative parts thereof.

The object of the invention is to provide a device which is simple, durable, and efficient for driving the shaft upon which it is secured and which is noiseless in its operation.

The invention consists of the new and novel parts and combination of parts hereinafter more fully described, and pointed out in the claims.

Figure 1:
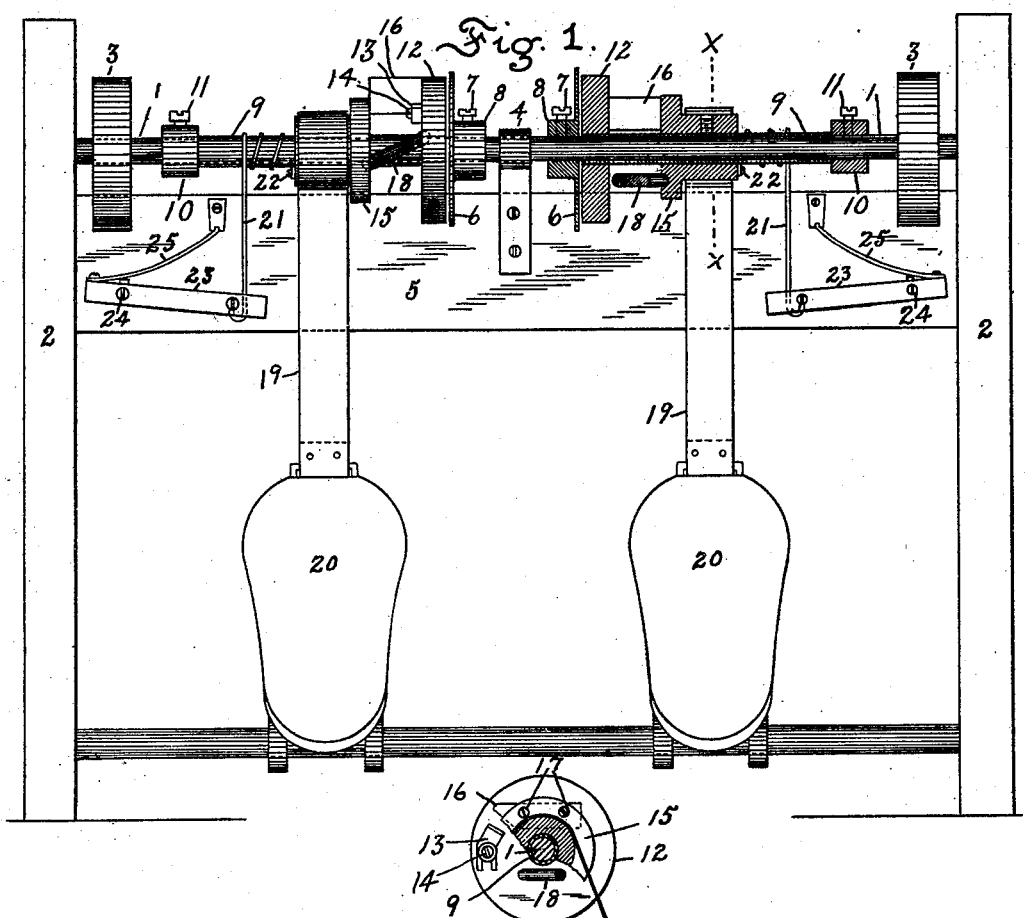
Figure 2:
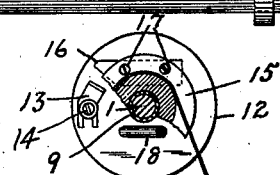

In the accompanying drawings, Figure 1 is a front elevation of my invention, partly in section, applied to a shaft to be driven thereby; and Fig. 2 is a section of same on the line *x x* of Fig. 1 and partly broken away.

Similar numerals refer to like parts throughout the several views.

Referring to the accompanying drawings, forming part of this specification, 1 designates a shaft journaled in the uprights 2 2 and provided with wheels or pulleys 3 3, from which power is transmitted to the operative parts of the machine by a belt or other suitable means. While I have shown two wheels or pulleys 3, one may be dispensed with. In the present instance the shaft 1 is supported in the center by a bearing 4, secured to the cross-piece 5. The uprights 2 2, as shown in the accompanying drawings, represent the ends of a mechanical piano-player.

The disks 6 6 are rigidly secured to the shaft 1 by means of the screws 7 7 passing through the hubs 8 8 and impinging against said shaft.

The sleeves 9 9 are loosely mounted upon the shaft 1 and are held in position and prevented from moving longitudinally by the collars 10 10, which latter are held fast to the shaft 1 by means of the screws 11 11.

The friction-disks 12 12 are loosely fitted over the sleeves 9 9 and are provided with lugs 13 13, which latter are held in position by the screws 14 14 and are for a purpose which will hereinafter appear.

The drums 15 15 are rigidly secured to the sleeves 9 9 and are provided with buffers 16 16, held thereto by screws 17 17. The toggle-pins 18 18 have one of their ends loosely embedded in the side of the drum 15 and extend diagonally to and have their opposite ends loosely embedded in the friction-disks 12 12. The said drums are provided with belts 19 19, having one of their ends secured thereto, and are wrapped around the said drums several times, the opposite ends of the said belts being secured to the treadles 20 20.

The straps 21 21 have one of their ends secured to the side of the drums 15 15 by the screws 22 22, extend around the sleeves 9 9 several times, and have their opposite ends secured to the levers 23 23. The said levers 23 23 are pivoted at 24 24 and are held to their normal position by the springs 25 25.

The operation of the device is as follows: When the treadle 20 is pressed down, the belt 19 revolves the drum 15 and sleeve 9 on the shaft 1. As the said drum revolves the toggle-pin 18 forces the friction-disk 12 against the face of the disk 6, revolving the latter, and consequently the shaft 1, to which it is secured. The revolving of the drum 15 causes the strap 21 to wind around the sleeve 9 and pull the end of the lever 23 up against the tension of the spring 25. When the treadle 20 is released, the lever 23 will be returned to its normal position by the spring 25, which causes the strap 21 to revolve the drum 15 and sleeve 9 in a direction opposite to that caused by the pressure on the treadle. When the drum 15 begins to return to its normal position, the pressure against the end of the toggle-pin 18 is released, allowing the friction-disk 12 to move away from the disk 6. The buffer 16 on the drum then strikes the lugs 13 on the friction-disk 12 and carries the latter back to its normal position. This operation applies to both the friction-clutches.

In operating the device the treadles are forced down alternately—that is to say, when one is forced down the other is released, thereby causing a continuous revolution of the shaft 1.

While I have shown only one toggle-pin connecting the friction-disk and drum, it is obvious any number may be used.

Having thus described my invention, what I claim as new, and desire to secure by Letters Patent, is—

1. In a friction-clutch, the combination with a shaft, of a disk rigidly secured to the shaft; a friction-disk loosely mounted on the shaft; a drum loosely mounted on said shaft; means to limit the lateral movement of the drum on the shaft; a toggle-pin connecting the drum and friction-disk; and means to revolve the said drum, substantially as and for the purpose described.

2. In a friction-clutch, the combination with a shaft, of a disk rigidly secured to the shaft; a friction-disk loosely mounted on the shaft; a drum loosely mounted on said shaft; means to limit the lateral movement of the drum on the shaft; a toggle-pin connecting the drum and friction-disk; means to revolve the said drum in one direction; and means to cause the said drum to return to its normal position, substantially as and for the purpose described.

3. In a friction-clutch, the combination with a shaft, of a disk rigidly secured to the shaft; a sleeve loosely mounted on the said shaft; means to limit the lateral movement of the sleeve on the shaft; a friction-disk loosely mounted on the said sleeve; a drum secured to said sleeve; a toggle-pin connecting the said drum and friction-disk; and means to revolve the said drum, substantially as and for the purpose described.

4. In a friction-clutch, the combination with a shaft, of a disk rigidly secured to the shaft; a sleeve loosely mounted on the said shaft; means to limit the lateral movement of the sleeve on the shaft; a friction-disk loosely mounted on said sleeve; a drum secured to said sleeve; a toggle-pin connecting the said drum and friction-disk; means to revolve the drum a predetermined distance in one direction; and means to return the said drum to its normal position, substantially as and for the purpose described.

5. In a friction-clutch, the combination with a shaft, of a disk rigidly secured to the said shaft; a sleeve loosely mounted on the said shaft; means to limit the lateral movement of the sleeve on the shaft; a friction-disk loosely mounted on the said sleeve and having a lug on one side; a drum secured to the said sleeve and carrying a buffer; a toggle-pin connecting the said drum and friction-disk; means to revolve the drum in one direction a predetermined distance; and means to return the said drum to its normal position, substantially as and for the purpose described.

6. In a friction-clutch, the combination with a shaft, of a disk rigidly secured thereto; a sleeve loosely mounted on the shaft; means to limit the lateral movement of the sleeve on the shaft; a friction-disk loosely mounted on said sleeve; a drum secured to said sleeve; a toggle-pin connecting the said drum and friction-disk; a buffer carried by said drum; a belt secured to the said drum for revolving the latter a predetermined distance; and a strap to return the drum to its normal position, substantially as and for the purpose described.

In testimony whereof I affix my signature in the presence of two witnesses.

JOHN A. SMITH.

Witnesses:
  CHAPIN A. FERGUSON,
  GEORGE H. READ.